United States Patent
Moore

(10) Patent No.: US 9,926,034 B2
(45) Date of Patent: Mar. 27, 2018

(54) EMERGENCY REPLACEMENT SHIFTER PEG

(71) Applicant: Darryl R. Moore, Concord, NC (US)

(72) Inventor: Darryl R. Moore, Concord, NC (US)

(73) Assignees: Angel M. Cotto, New City, NY (US); Darryl R. Moore, Concord, NC (US)

( * ) Notice: Subject to any disclaimer, the term of this patent is extended or adjusted under 35 U.S.C. 154(b) by 91 days.

(21) Appl. No.: 15/134,847

(22) Filed: Apr. 21, 2016

(65) Prior Publication Data

US 2017/0129565 A1    May 11, 2017

Related U.S. Application Data

(60) Provisional application No. 62/251,385, filed on Nov. 5, 2015.

(51) Int. Cl.
*G05G 1/48* (2008.04)
*B62K 23/08* (2006.01)

(52) U.S. Cl.
CPC ................... *B62K 23/08* (2013.01)

(58) Field of Classification Search
CPC ............................ B62K 23/00; B62K 23/08
See application file for complete search history.

(56) References Cited

U.S. PATENT DOCUMENTS

| 1,213,825 A * | 1/1917 | Bloom | G05G 1/487 74/562 |
| 1,558,697 A * | 10/1925 | Marts | G05G 1/405 74/562 |
| 2009/0165907 A1 * | 7/2009 | Hollingsworth | B62K 23/08 150/167 |

\* cited by examiner

*Primary Examiner* — Vicky A Johnson

(57) ABSTRACT

A replacement shifter peg is easily stored and allows for broken shift levers to quickly be repaired while requiring minimal tool use. The replacement shifter peg includes an adapter arm, a pedal, and a fastener. The adapter arm receives a broken shift lever, while the pedal is connected to the adapter arm in order to serve as new shifter peg. The adapter arm is formed from a tubular body (with a shaft-receiving region defined inside), a mount end that receive the broken shift lever, and a free end to which the pedal is connected. Fastener receptacles traverse through the tubular body to provide multiple position choices for fastening the replacement shifter peg relative to a broken shift lever. The fastener is a set screw that creates a vise by pressing against a shift lever positioned within the shaft-receiving region.

7 Claims, 7 Drawing Sheets

EMERGENCY REPLACEMENT SHIFTER PEG

The current application claims a priority to the U.S. Provisional Patent application Ser. No. 62/251,385 filed on Nov. 5, 2015.

FIELD OF THE INVENTION

The present invention relates generally to a replacement shifter peg that allows for quick and convenient replacement of a broken shifter peg.

BACKGROUND OF THE INVENTION

Motorcycle shifter pegs are critical to the function of a motorcycle. It is not uncommon for a motorcycle shifter peg to snap or break at the joint due to wear or excessive force. A broken shifter peg will make it nearly impossible for the rider to properly shift gears for riding. Because trying to ride a motorcycle with a broken shifter peg is extremely dangerous, riders generally must have their motorcycle towed to a nearby shop or attach a make-shift shifter peg to reach a shop for repairs. The present invention aims to provide an emergency replacement shifter peg that the rider can install upon breaking their shifter peg that is both reliable and easy to install on the go. The present invention, or otherwise referred to as the emergency replacement shifter peg, provides a quick and convenient shifter peg replacement for when the original shifter peg fails. The emergency replacement shifter peg will slip over the broken shifter peg lever and will be fastened in place, providing a reliable emergency shifter peg for the rider. Utilizing the present invention, the rider will be able to safely ride their motorcycle to a nearby shop for a full replacement shifter peg. Alternatively, the user may choose to continue riding their motorcycle throughout the day utilizing the emergency replacement shifter peg. However, although the present invention provides a secure and reliable emergency replacement shifter peg, it is understood that the present invention is not a permanent replacement for the broken shifter peg. In essence, the present invention provides an emergency shifter peg attachment that eliminates the need to immediately replace the broken shifter peg on a motorcycle upon breaking.

DETAIL DESCRIPTIONS OF THE INVENTION

All illustrations of the drawings are for the purpose of describing selected versions of the present invention and are not intended to limit the scope of the present invention.

Figure 1:
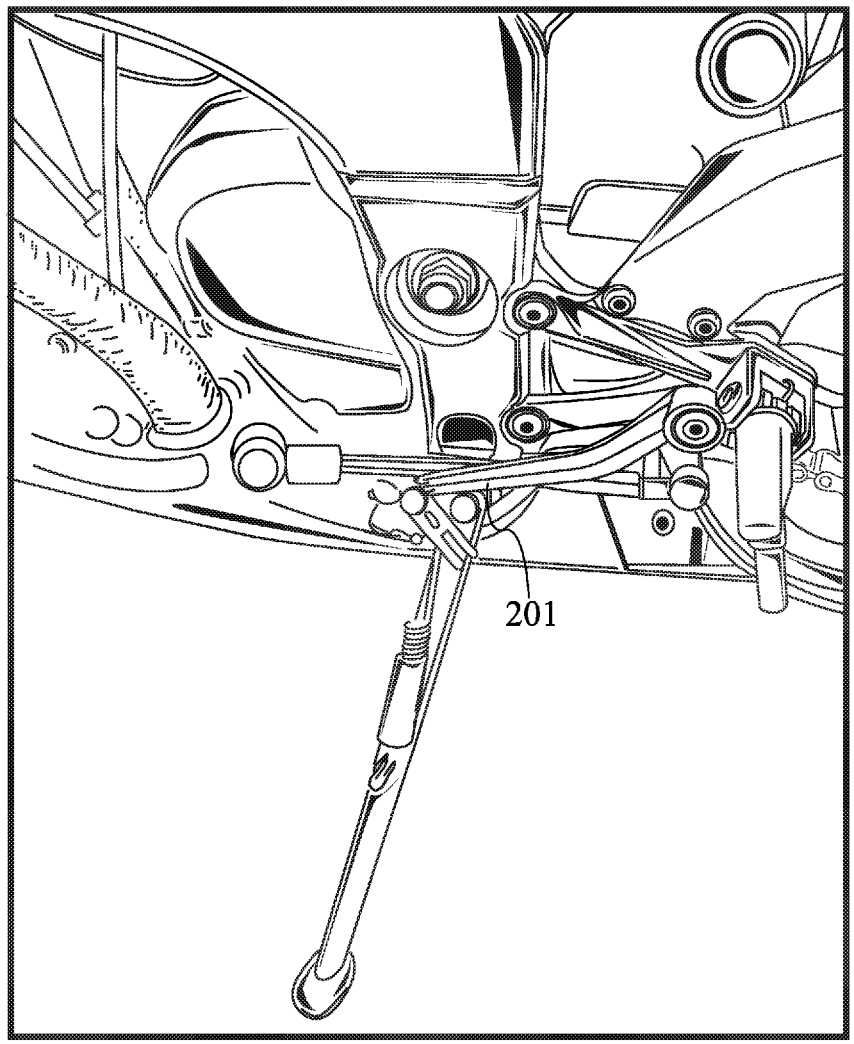
FIG. 1 is an illustration showing a motorcycle with a broken shift lever.
Figure 2:
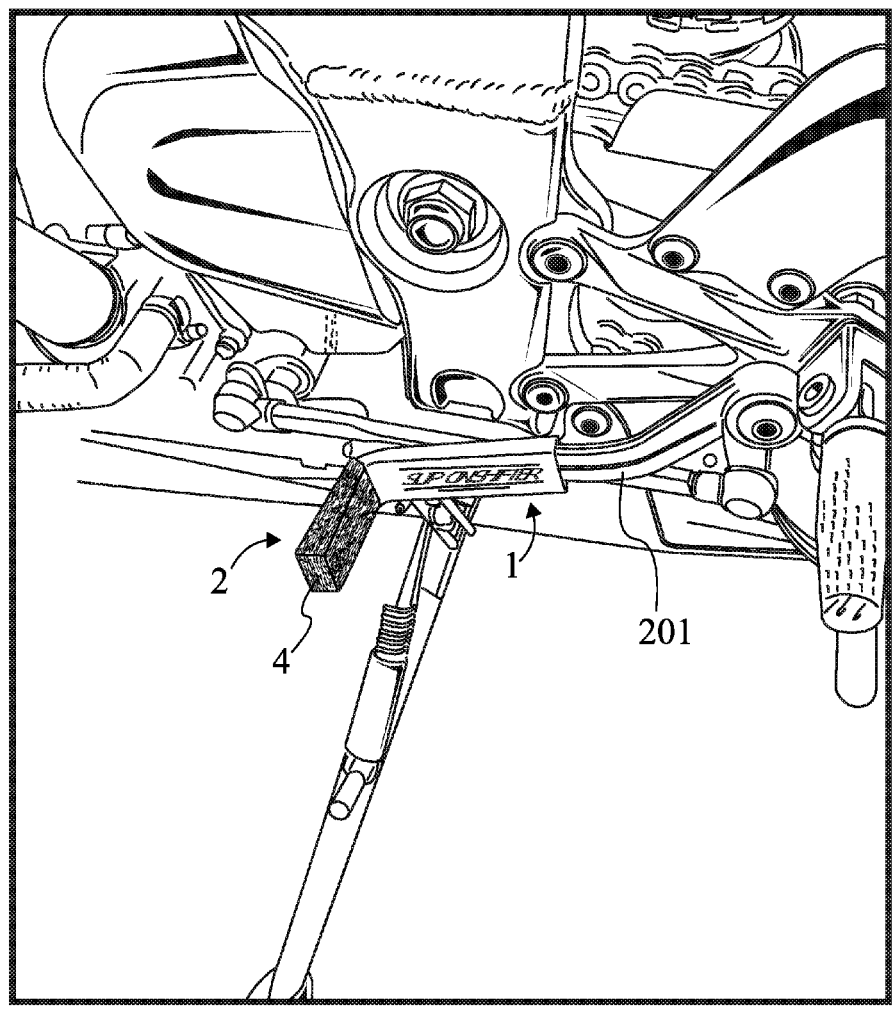
FIG. 2 is an illustration showing a broken shift lever which is fixed through use of the present invention.
Figure 3:
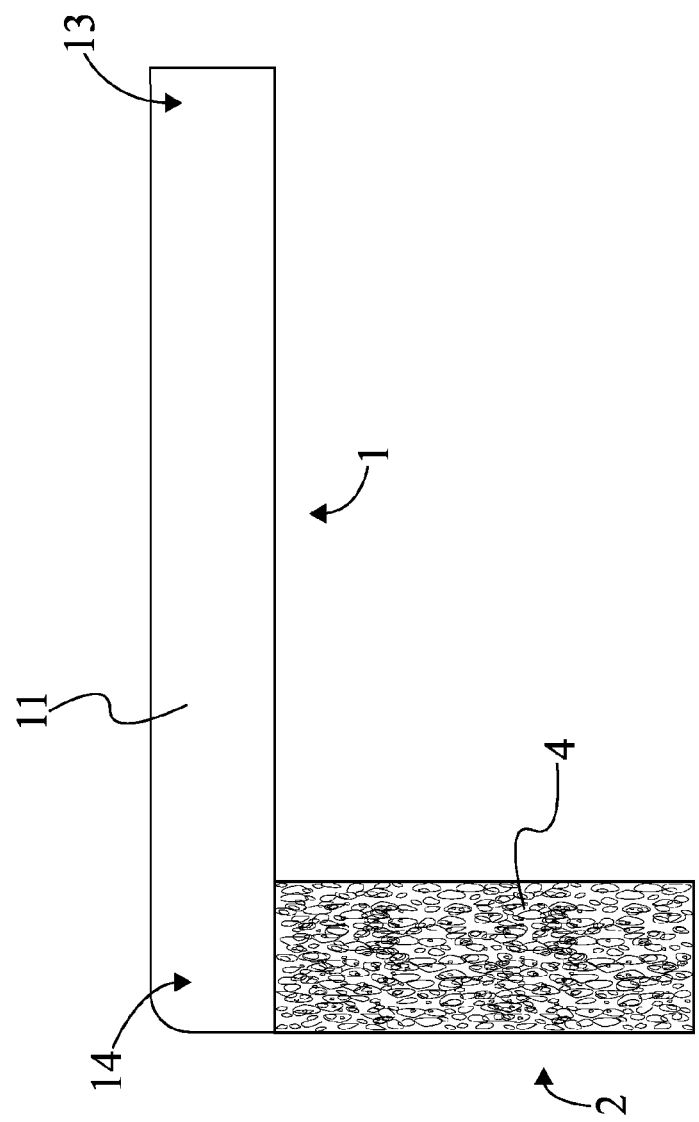
FIG. 3 is a top view of the present invention.
Figure 4:
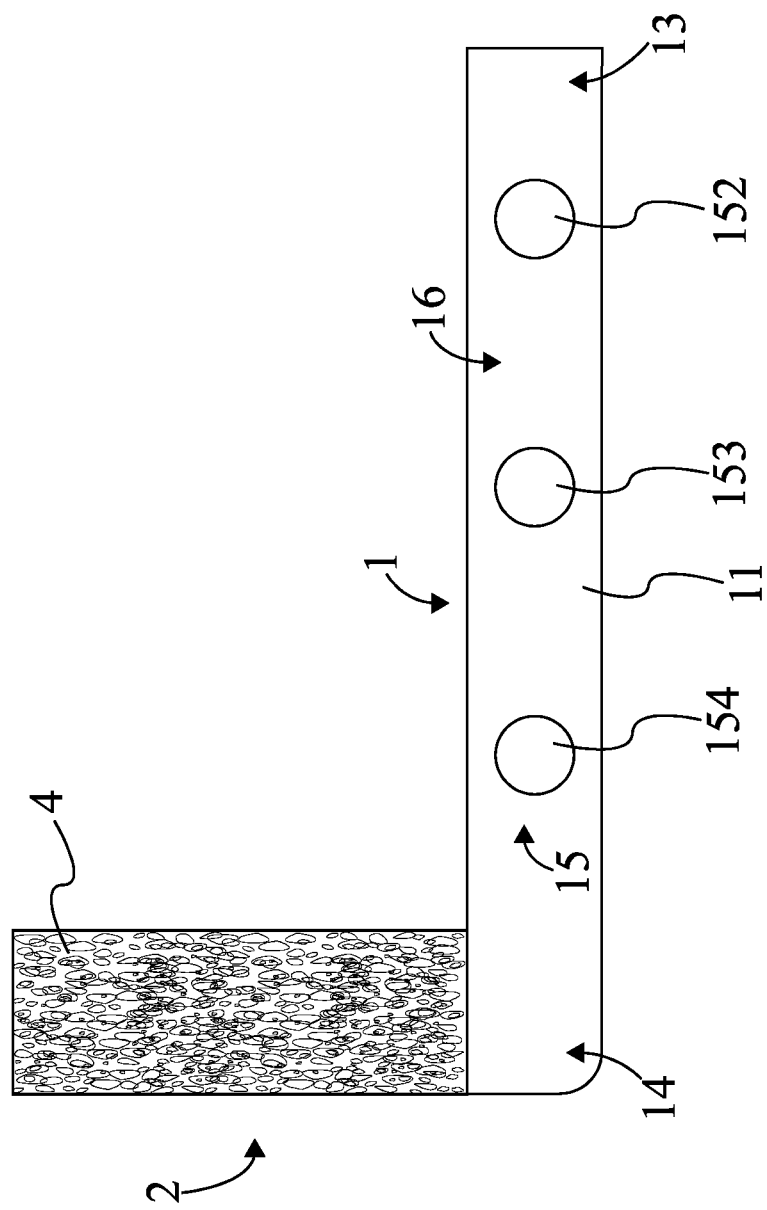
FIG. 4 is a bottom view of the present invention.
Figure 5:
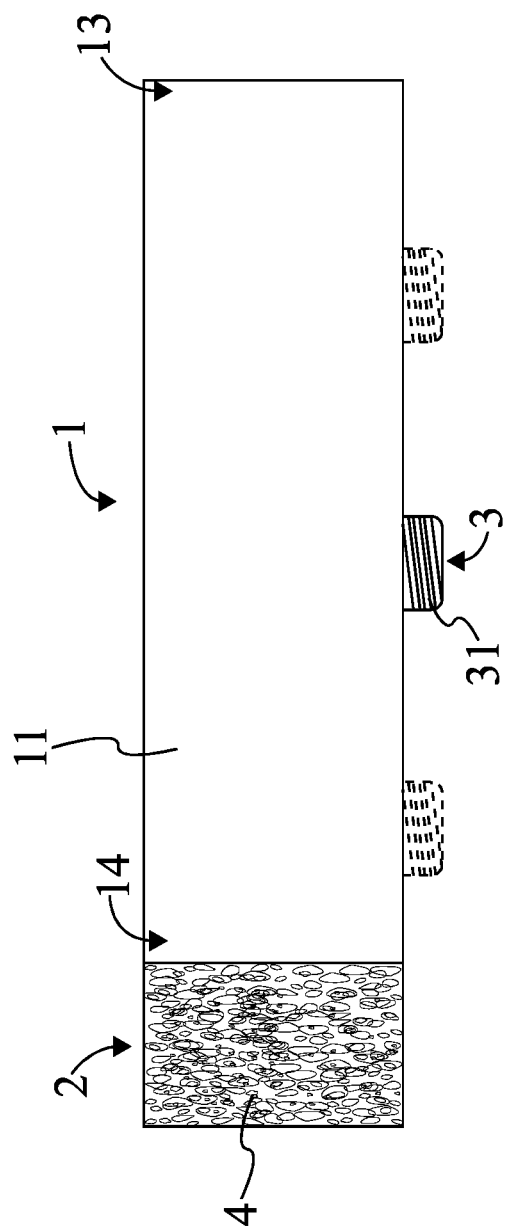
FIG. 5 is a front view of the present invention.
Figure 6:
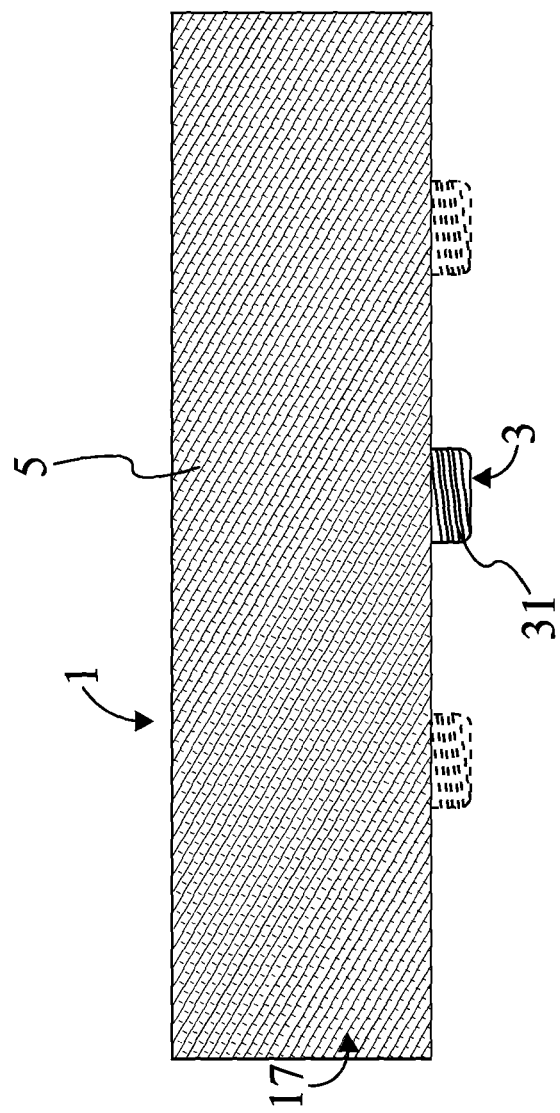
FIG. 6 is a rear view of the present invention.

The present invention is a convenient apparatus which is used to fix broken shifter assemblies, i.e. as relates to motorcycles. The present invention allows for broken shifter assemblies to easily and quickly be fixed in a variety of situations, without requiring the use of specialized tools or equipment beyond the components of the present invention which are subsequently described. Use of the present invention to fix a broken shifter assembly is shown through FIG. 1 and FIG. 2. The present invention is independently depicted in FIG. 3-FIG. 7.

The present invention comprises an adapter arm 1, a pedal 2, and a fastener 3. The adapter arm 1 serves to couple the pedal 2 with a broken shift lever 201, while the pedal 2 itself serves as an interface for a user's foot. The fastener 3 secures the adapter arm 1 and the pedal 2 in place with respect to the broken shift lever 201. The adapter arm 1 itself comprises a tubular body 11, a shaft-receiving region 12, a mount end 13, a free end 14, and a plurality of fastener receptacles 15. The shaft-receiving region 12, into which a broken shift lever 201 is placed, is positioned within the tubular body 11. The plurality of fastener receptacles 15 is positioned along the tubular body 11, such that the fastener 3 may be used to lock a broken shift lever 201 within the adapter arm 1. The plurality of fastener receptacles 15 is further defined as traversing into the shaft-receiving region 12 through the tubular body 11, enabling access to the shaft-receiving region 12 for a fastener 3. The pedal 2 itself is connected to the adapter arm 1, such that the pedal 2 and the adapter arm 1 form a single part. In the interests of ergonomics and providing optimal surface area for a user's foot, the pedal 2 is oriented perpendicular to the adapter arm 1. This also creates sufficient space for a user's foot to be placed on the pedal 2 without being interfered with by the adapter arm 1. Further, to maximize torque and make the pedal 2 easier to operate, the pedal 2 is positioned adjacent to the free end 14 of the adapter arm 1. This is opposite the mount end 13 through which the broken shifter end is inserted. Finally, the fastener 3 is traversed into the shaft-receiving region 12 through one of the plurality of fastener receptacles 15. This allows the fastener 3 to secure the adapter arm 1 to a broken shift lever 201 positioned in the shaft-receiving region 12.

The general description above outlines the core concept of the present invention; the tubular body 11 and more specifically shaft-receiving region 12 allow for a broken shifter assembly to be sleeved by the adapter arm 1. The pedal 2, which is adjacently and perpendicularly connected to the adapter arm 1, acts as a replacement peg for the broken shifter assembly. This replacement shifter assembly is held in place by a fastener 3, which traverses through one of a plurality of fastener receptacles 15 of the adapter arm 1. In order to properly align with the selected fastener receptacle, the fastener 3 must be concentric with said fastener receptacle. The fastener 3 thus anchors the adapter arm 1 to a broken shift lever 201 in the shaft-receiving region 12. Ultimately, this allows a user to easily and quickly replace a broken shifter assembly, whether at home, on the side of the road, or in another location. Of course, several enhancements to the core concept of the present invention are possible, such as those described below for a preferred embodiment of the present invention.

Elaborating upon the above, the preferred embodiment of the present invention comprises a grip-enhancing layer 4. This grip-enhancing layer 4 is adhered to the pedal 2. Resultantly, the pedal 2 is enveloped by the grip-enhancing layer 4. The grip-enhancing layer 4 has a higher coefficient of friction, making it easier for a user to maintain contact between their foot and the pedal 2. Correspondingly, this reduces the chances of a user's foot slipping from the pedal 2, which is undesirable and potentially dangerous. The specific implementation of the grip-enhancing layer 4 is not restricted by the present invention. One possible example is a rubber sleeve which is placed over the pedal 2. Another example is a rubberized coating which is sprayed or otherwise applied to the pedal 2. Further applications of the grip-enhancing layer 4 remain possible within the scope of the present invention. The grip-enhancing layer 4 is visible in FIG. 2-FIG. 5 and FIG. 7.

Figure 7:
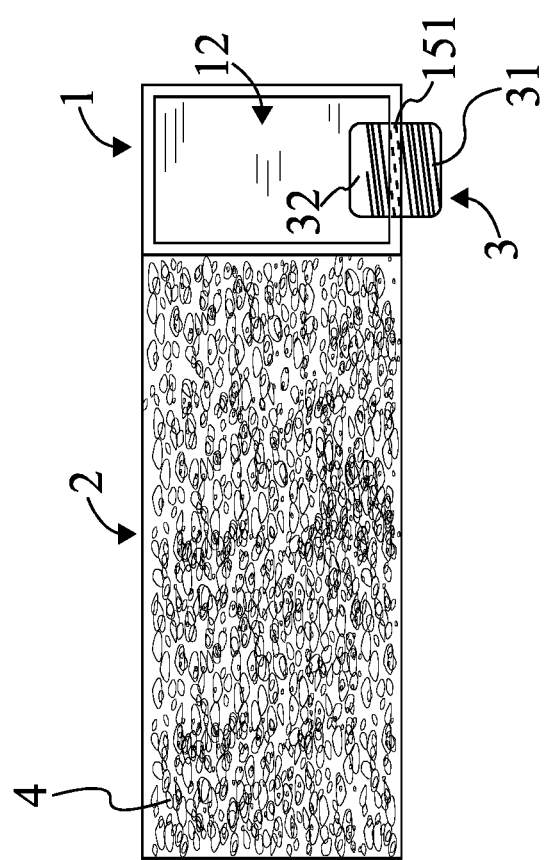
FIG. 7 is right side view of the present invention.

Describing the fastener 3 aspect in more detail, in the preferred embodiment the fastener 3 comprises a threaded body 31 and a contact end 32, visible in FIG. 7. Correspondingly, each of the plurality of fastener 3 receptacles 15 comprises a threaded portion 151, also visible in FIG. 7. This allows the fastener 3 to easily be screwed to a selected fastener 3 receptacle, with the threaded body 31 of the fastener 3 being helically engaged with the threaded portion 151 of the fastener 3 receptacle. This threaded engagement also helps prevent undesired movement or shifting of the fastener 3, which ultimately helps secure the adapter arm 1 to a broken shift lever 201. The contact end 32 of the fastener 3 is positioned interior to the tubular body 11, where the contact end 32 presses against the enclosed broken shift lever 201. With sufficient pressure, enough friction is created between the contact end 32 and the broken shift lever 201 to prevent unintended movement of the fastener 3 and adapter arm 1 relative to the broken shift lever 201. In the preferred embodiment, the fastener 3 is specifically a set screw. A set screw, compared to other types of screws, is well suited for the present invention as a set screw does not need to be drilled into the broken shift lever 201. Furthermore, it is preferable that the set screw can be driven by a hex key (also referred to as an Allen key), which is compact, low cost, and convenient to keep accessible. This is in line with the present invention's goal of providing a simple and easy means of fixing a broken shift lever 201.

The set screw is the type of fastener 3 used by the preferred embodiment as the set screw creates its own vise once tightened. The vise is a simple and effective means of securing the present invention to a broken shift lever 201. Still, other embodiments may choose to utilize alternative fasteners 3 or fastening means. Preferred alternative fasteners 3 would be ones that can create a vise grip (and thus do not have to be drilled into the shift lever 201). Preferred alternative fastening mechanisms would be any mechanism that requires minimal or no tools for operation and is capable of safely securing the present invention to a broken shift lever 201.

Another preferred component of the present invention is an abrasive coating 5. The abrasive coating 5 is adhered across a first surface 16 of the adapter arm 1. Rather than being provided for improved grip (as with the grip-enhancing layer 4), the abrasive coating 5 allows a user to smooth a broken shift lever 201 by filing it down with the abrasive coating 5. The abrasive coating 5 effectively serves as integrated file for the present invention. The abrasive coating 5 is a beneficial and desirable component as it allows for a broken shift lever 201 to be treated without requiring specialized tools (e.g. a file) which a user might not have access to, especially if road-side repairs are being made. The abrasive coating 5 is visible in FIG. 6.

In order to provide an element of adaptability, the plurality of fastener receptacles 15 preferably comprises a first receptacle 152, a second receptacle 153, and a third receptacle 154. The first receptacle 152 is defined as being positioned adjacent to the mount end 13. The second receptacle 153 is defined as being centrally positioned between the mount end 13 and the free end 14. The third receptacle 154 is defined as being positioned adjacent to the free end 14. These receptacles 15 are positioned in a straight line along the adapter arm 1, with equidistance spacing between each of the three receptacles 15. Providing multiple options for the fastener 3 is desirable as shift levers 201 don't always break at the same length; sometimes the break might be very close to the peg and other times the break is further away from the peg. Since it is preferable to place the pedal 2 in roughly the same area as the peg was (prior to breakage), multiple fastener receptacles 15 are provided. A user can thus select the fastener receptacle 15 that is best suited to their specific situation.

Several further attributes are desirable for the present invention. For example the tubular body 11 preferably has a rectangular cross section. A rectangular cross section is ideal as shift lever 201 usually have similar cross sections, which makes for an ideal fit between the tubular body 11 and a broken shift lever 201. Other shapes, conversely, are less suited to receiving a broken shift lever 201. For example, triangular shapes and elliptical shapes have less contact with a broken shift lever 201; resultantly, they are less capable of securing a broken shift lever 201 as compared to an ideally shaped rectangular tubular body 11.

Another preference of the present invention elaborates upon placement of the plurality of fastener 3 receptacles 15. As the fastener 3 will only partially traverse into the shaft-receiving region 12 (i.e. a portion of the fastener 3 will remain external to the tubular body 11), it is beneficial to position the plurality of fastener receptacles 15 at an unobtrusive location. Thus, the plurality of fastener receptacles 15 is positioned along a first surface 16 of the tubular body 11. This first surface 16 is considered a "bottom" surface relative to the ground, with the first surface 16 being closest to the ground. This ensures that a fastener 3 does not interfere with operation of the present invention in an inconvenient or unsafe manner. For example, if the fastener 3 were positioned through a receptacle on the top surface, it's possible that a user's foot could become caught or impeded by the exposed fastener 3.

For similar reasoning, the abrasive coating 5 is positioned on a second surface 17 of the tubular body 11, opposite the pedal 2. In reference to a motorcycle, this is an inside surface, such that the abrasive coating 5 is facing the body of the motorcycle. This placement is desirable as it reduces the likelihood of a user slipping along the abrasive coating 5 and becoming injured. As the abrasive coating 5 is provided for filing down a broken shifter assembly, it would be capable of causing serious injury to an unprotected person, and even someone wearing protective gear is susceptible to injury via the abrasive coating 5.

A variety of materials are possible for the present invention, as long as they have certain qualities. For example, the tubular body 11 must be made from a strong rigid material that will not become deformed under external forces (e.g. being used for shifting gears). Steel is a material which meets the above requirements, but is by no means the only material the tubular body 11 can be constructed from; any sufficiently rigid and sturdy material may be used. Similarly, while rubber is a suitable choice for the grip-enhancing layer 4, any material which provides a higher coefficient of friction may be used for the like grip-enhancing layer 4.

Although the invention has been explained in relation to its preferred embodiment, it is to be understood that many other possible modifications and variations can be made without departing from the spirit and scope of the invention as hereinafter claimed.

What is claimed is:
1. A replacement shifter peg comprising:
an adapter arm;

a pedal;
a fastener;
an abrasive coating;
the adapter arm comprising a tubular body, a shaft-receiving region, a mount end, a free end, and a plurality of fastener receptacles, a first surface, a second surface and a third surface;
the shaft-receiving region being positioned within the tubular body;
the plurality of fastener receptacles being positioned along the tubular body;
the plurality of fastener receptacles traversing into the shaft-receiving region through the tubular body;
the pedal being connected perpendicular to the adapter arm;
the pedal being positioned adjacent to the free end;
the fastener traversing into the shaft-receiving region through one of the plurality of fastener receptacles;
the plurality of fastener receptacles being positioned on the first surface;
the abrasive coating being positioned on the second surface;
the pedal being positioned on the third surface; and
the first surface being located in between the second surface and the third surface so as to render the abrasive coating and the pedal being located opposite to each other.

2. The replacement shifter peg as claimed in claim 1 comprising:
a grip-enhancing layer; and
the pedal being enveloped by the grip-enhancing layer.

3. The replacement shifter peg as claimed in claim 1 comprising:
the fastener comprising a threaded body and a contact end;
each of the plurality of fastener receptacles comprising a threaded portion;
the threaded body being helically engaged with the threaded portion of one of the plurality of fastener receptacles; and
the contact end being positioned within the tubular body.

4. The replacement shifter peg as claimed in claim 1 comprising:
the fastener being a set screw.

5. The replacement shifter peg as claimed in claim 1 comprising:
the plurality of fastener receptacles comprising a first receptacle, a second receptacle and a third receptacle;
the first receptacle, the second receptacle and the third receptacle being positioned along the first surface;
the first receptacle being positioned adjacent to the mount end;
the second receptacle being centrally positioned between the mount end and the free end; and
the third receptacle being positioned adjacent to the free end.

6. The replacement shifter peg as claimed in claim 5 comprising:
the first receptacle, the second receptacle and the third receptacle being linearly aligned with each other.

7. The replacement shifter peg as claimed in claim 1 comprising:
the abrasive coating being adhered across the second surface.

\* \* \* \* \*